US009975579B2

United States Patent
Nakamoto

(10) Patent No.: US 9,975,579 B2
(45) Date of Patent: May 22, 2018

(54) COWL STRUCTURE

(71) Applicant: TOYOTA JIDOSHA KABUSHIKI KAISHA, Toyota-shi (JP)

(72) Inventor: Yoshiaki Nakamoto, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days. days.

(21) Appl. No.: 15/244,403

(22) Filed: Aug. 23, 2016

(65) Prior Publication Data

US 2017/0057554 A1   Mar. 2, 2017

(30) Foreign Application Priority Data

Aug. 28, 2015   (JP) .................................. 2015-169573

(51) Int. Cl.
*B62D 25/08*   (2006.01)

(52) U.S. Cl.
CPC .................................. *B62D 25/081* (2013.01)

(58) Field of Classification Search
CPC .................................................. B62D 25/081
USPC .......................................................... 296/192
See application file for complete search history.

(56) References Cited

U.S. PATENT DOCUMENTS

| 6,869,134 B2 * | 3/2005 | Kato | B62D 25/081 |
| | | | 296/187.01 |
| 8,602,479 B2 * | 12/2013 | Kuwabara | B60K 37/00 |
| | | | 180/90 |

FOREIGN PATENT DOCUMENTS

| JP | 2003-327165 | 11/2003 |
| JP | 2008-100533 | 5/2008 |
| JP | 2009-137483 A | 6/2009 |
| JP | 2011-37288 | 2/2011 |
| JP | 2015-77901 | 4/2015 |

* cited by examiner

*Primary Examiner* — Joseph D. Pape
*Assistant Examiner* — Dana D Ivey
(74) *Attorney, Agent, or Firm* — Oblon, McClelland, Maier & Neustadt, L.L.P.

(57) ABSTRACT

A cowl structure includes: a cowl panel that supports a bottom end portion of a windshield; a dash upper panel that extends in a vehicle up-down direction when seen in a vehicle side view, and has a top end portion bonded to the cowl panel; a reinforcing component that is bonded to a vehicle front surface or a vehicle rear surface of a bottom portion of the dash upper panel, and that forms a closed cross section with the dash upper panel; a first air intake port that is formed in the dash upper panel at a vehicle upper side of a bond portion where the dash upper panel is bonded to the reinforcing component; and a second air intake port that is formed in a bottom portion of the dash upper panel and in the reinforcing component, and that introduces air through the interior of the closed cross section.

6 Claims, 4 Drawing Sheets

COWL STRUCTURE

CROSS-REFERENCE TO RELATED APPLICATION

This application is based on and claims priority under 35 USC 119 from Japanese Patent Application No. 2015-169573 filed on Aug. 28, 2015, the disclosure of which is incorporated by reference herein.

BACKGROUND

Technical Field

The present disclosure relates to a cowl structure.

Related Art

A cowl structure in which vehicle top side is formed as an open cross-sectional area, and in which vehicle bottom side is formed as a closed cross-sectional area is commonly known as a cowl structure that is provided with a cowl panel that supports a bottom end portion of a windshield. As a cowl structure of this type, Japanese Patent Application Laid-Open (JP-A) No. 2011-37288 describes a cowl structure including a cowl panel, a dash upper panel that is bonded to the cowl panel, and a dash lower panel that is bonded to a vehicle bottom side of the dash upper panel and is formed as a closed cross-sectional structure. Here, an open cross-sectional area is formed by the cowl panel and the dash upper panel. In addition, an air introduction port (i.e., an air intake port) that is used to introduce air into an air-conditioning unit (i.e., an air-conditioning device) is also formed in the dash upper panel.

However, in the technology described in the aforementioned documentation, if an air intake port that is sufficiently large to guarantee a satisfactory air conditioning performance (i.e., the air-conditioner air flow and the like) is formed in the dash upper panel, then the size of the open cross-sectional area also increases. Because of this, the distance in the vehicle up-down direction from the windshield to the closed cross-sectional area is lengthened, and there is room for improvement from the viewpoint of improving the support rigidity for the windshield.

SUMMARY

In consideration of the above-described circumstances, the present disclosure provides a cowl structure that is possible to improve the support rigidity for a windshield while guaranteeing a satisfactory air conditioning performance.

A first aspect of the present disclosure is a cowl structure that includes a cowl panel that supports a bottom end portion of a windshield from a vehicle bottom side; a dash upper panel that extends in a vehicle up-down direction when seen in a vehicle side view and has a top end portion that is bonded to the cowl panel; a reinforcing component that is bonded to a surface of a vehicle front side or to a surface of a vehicle rear side of a bottom portion of the dash upper panel, and that forms a closed cross section together with the dash upper panel; a first air intake port that is formed in the dash upper panel in a location at a vehicle upper side of a bond portion where the dash upper panel is bonded to the reinforcing component, and that introduces air into an air-conditioning device; and a second air intake port that is formed in a bottom portion of the dash upper panel and in the reinforcing component, and that introduces air into the air-conditioning device through an interior of the closed cross section.

In the present aspect, a top end portion of the dash upper panel is bonded to the cowl panel. In addition, the reinforcing component is bonded to a bottom portion of the dash upper panel, and a closed cross-sectional area is formed by the reinforcing component and the dash upper panel. Here, a first air intake port that is used to introduce air into an air-conditioning device is formed in the dash upper panel in a location on the vehicle top side of a bond portion where the dash upper panel is bonded to the reinforcing component. By employing this structure, traveling wind and the like is introduced into the air-conditioning device via the first air intake port.

In addition, a second air intake port that enables air to be introduced into the air-conditioning device through the interior of the closed cross section is formed in a bottom portion of the dash upper panel and in the reinforcing component. By employing this structure, traveling wind and the like is introduced into the air-conditioning device via this second air intake port. As described above, in addition to the open cross-sectional area in the upper-side portion of the dash upper panel, a path that enables traveling wind to be introduced into the air-conditioning device is also provided in the closed cross-sectional area in the lower-side portion thereof. By employing this structure, compared with a structure in which an air intake port is formed only in the open cross-sectional area, it is possible to reduce the size of the open cross-sectional area while guaranteeing a satisfactory air conditioning performance. Moreover, because the closed cross-sectional area can be positioned closer to the windshield by the same distance that the open cross-sectional area has been reduced, the support rigidity for the windshield can be improved.

In the present aspect, the dash upper panel may have a first bent portion at the vehicle upper side of the bond portion where the dash upper panel is bonded to the reinforcing component, and the first bent portion may be bent either to the vehicle front side or to the vehicle rear side.

In the above-described structure, because the upper-side portion of the dash upper panel, which is an open cross-sectional area, is bent, it easily undergoes bending deformation. By employing this structure, if the vehicle collides with a pedestrian or the like, the upper-side portion of the dash upper panel undergoes bending deformation with this bent portion forming the bending point of origin, and the impact load can be easily absorbed.

In this manner, according to the above-described structure, it is possible to improve the pedestrian protection performance.

In the present aspect, the reinforcing component may be bonded to a surface of the vehicle front side of the dash upper panel and includes a vertical wall portion that extends in the vehicle up-down direction, and a portion of the second air intake port may be formed in the vertical wall portion.

In the above-described structure, traveling wind and the like can be introduced into the interior of the closed cross section from the vertical wall portion that extends in the vehicle up-down direction. By employing this structure, compared with a structure in which a portion of the second air intake port is formed in a wall portion that slopes diagonally relative to the vehicle up-down direction, it is possible to increase the quantity of air that is introduced into the air-conditioning device.

In this manner, according to the above-described structure, it is possible to effectively introduce air into the air-conditioning device.

In the present aspect, the closed cross section may be formed in a polygonal shape, when seen in a vehicle side view, by a second bent portion that is formed in the dash upper panel and by a bent portion that is formed in the reinforcing component.

In the above-described structure, by forming bent portions in the dash upper panel and the reinforcing component, the rigidity of each of the individual components can be improved. By employing this structure, compared with a cross-sectional structure in which either the dash upper panel or the reinforcing component is formed in a planar shape, even if the cross-sectional area is the same, the support rigidity for the windshield can be improved.

In the present aspect, the reinforcing component comprises an upper flange at a top end portion thereof, the upper flange being bonded to the dash upper panel, and a bond portion where the upper flange is bonded to the dash upper panel may form a bottom edge of the first air intake port.

In the above-described structure, the bond portion in which the upper flange is bonded to the dash upper panel forms the bottom edge of the first air intake port. In other words, the bonded portion between the upper flange and the dash upper panel forms the boundary portion between the open cross-sectional area and the closed cross-sectional area. By employing this structure, the closed cross-sectional area can be positioned as close as possible to the windshield while still securing the open cross-sectional area.

In the present aspect, the first air intake port may be formed at a position that includes the first bent portion in the dash upper panel.

This configuration enables a smooth bending deformation to occur in the open cross-sectional area and an impact load can be easily absorbed.

In this manner, according to the above-described structure, even in a vehicle in which the height of the cowl (i.e., the height from the ground to the rear end of the hood) is low, it is still possible to improve the support rigidity for the windshield at the same time as a satisfactory air conditioning performance is guaranteed.

BRIEF DESCRIPTION OF THE DRAWINGS

Exemplary embodiments of the present disclosure will be described in detail based on the following figures, wherein.

DETAILED DESCRIPTION

A cowl structure according to an embodiment of the present disclosure will now be described using FIG. 1 through FIG. 3. Note that an arrow FR that is shown in these drawings indicates the front side of a vehicle, while an arrow UP indicates the upper side of the vehicle, and an arrow RH indicates the right side of the vehicle facing in the direction of forward travel. In the following description, unless stated otherwise, when the respective directions front-rear, up-down, and left-right are used, these refer respectively to the front-rear of the front-rear direction of a vehicle, the up-down of the up-down direction of a vehicle, and the left-right when facing in the direction of forward travel of a vehicle.

Figure 1:
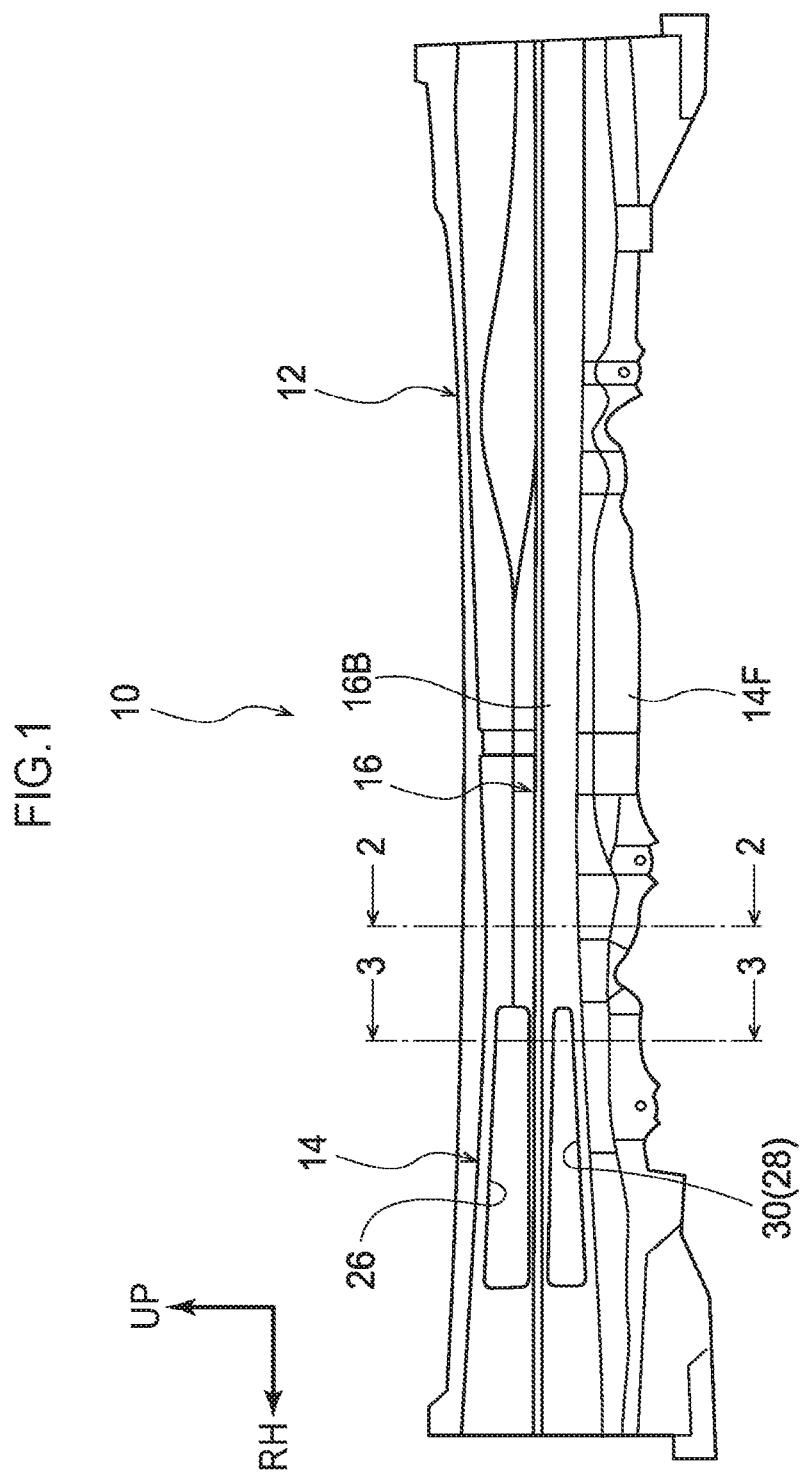
FIG. 1 is a front view showing a cowl structure according to an embodiment of the present disclosure.

FIG. 1 is a front view as seen from the front of a vehicle showing principal portions of a vehicle 10 to which a cowl structure according to the present embodiment has been applied. FIG. 2 is an enlarged vertical cross-sectional view showing a cross section taken along a line 2-2 in FIG. 1. In FIG. 1, for convenience of description, a windshield 20 has been omitted from the illustration.

Figure 2:
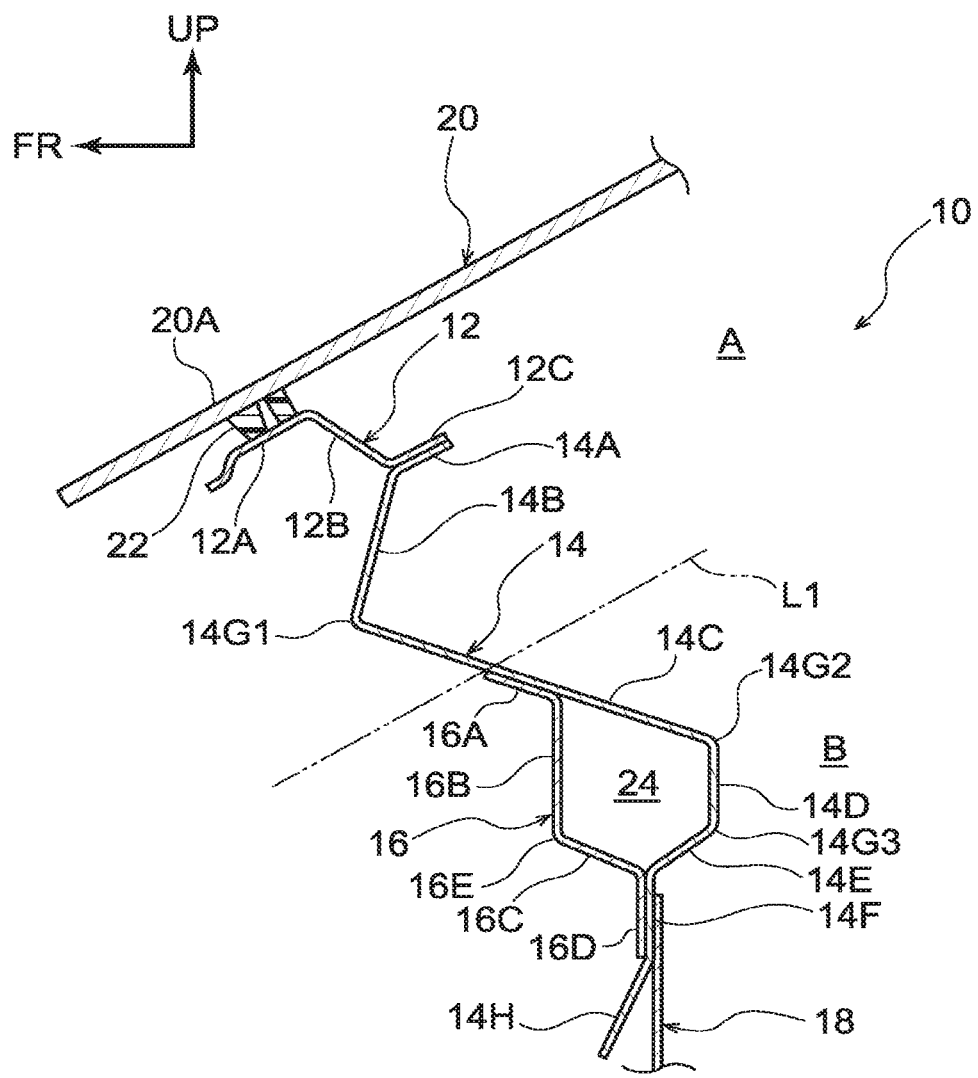
FIG. 2 is an enlarged cross-sectional view showing an enlargement of a cross section taken along a line 2-2 in FIG. 1.

As shown in FIG. 2, the cowl structure of the present embodiment includes a cowl panel 12, a dash upper panel 14, and a cross member 16 that serves as a reinforcing component. The cowl panel 12 is disposed along a bottom surface of a bottom end portion 20A of the windshield 20 such that a longitudinal direction of the cowl panel 12 extends in the vehicle transverse direction. The cowl panel 12 supports the bottom end portion 20A of the windshield 20 from the vehicle lower side.

Specifically, the cowl panel 12 includes a supporting portion 12A that, when seen in a vehicle side view, extends in parallel with the windshield 20. A sealing component 22 is also provided between the supporting portion 12A and the windshield 20, and the bottom end portion 20A of the windshield 20 is supported from the vehicle bottom side by the supporting portion 12A via the sealing component 22. Furthermore, the cowl panel 12 is also provided with an inclined wall portion 12B that extends diagonally from a rear end portion of the supporting portion 12A towards the downward and rearward sides of the vehicle. A flange 12C also extends from a rear end portion of the inclined wall portion 12B towards the upward and rearward sides of the vehicle.

A dash upper panel 14 is bonded to the flange 12C. The dash upper panel 14 is disposed in the same way as the cowl panel 12 such that the longitudinal direction of the dash upper panel 14 extends in the vehicle transverse direction (see FIG. 1). The dash upper panel 14 also extends in the vehicle up-down direction when seen in a vehicle side view, and an upper-side top flange 14A that is bonded to the flange 12C is formed on a top end portion of the dash upper panel 14.

The upper-side top flange 14A is bonded to a bottom surface of the flange 12C of the cowl panel 12. The dash upper panel 14 is also provided with an upper inclined wall portion 14B that extends from a front end portion of the upper-side top flange 14A towards the downward and forward sides of the vehicle. An intermediate inclined wall portion 14C extends from a bottom end portion of the upper inclined wall portion 14B towards the downward and rearward sides of the vehicle. In this manner, the upper-side portion side of the dash upper panel 14 is bent towards the vehicle front side by the upper inclined wall portion 14B and the intermediate inclined wall portion 14C. Namely, the upper-side portion of the dash upper panel 14 is formed having a substantially V-shaped cross section when seen in a vehicle side view, whose base portion is formed by a bent portion 14G1, and whose vehicle upward and rearward sides are open. Note that this bent portion 14G1 is formed on the vehicle upward side of a bond portion where a crossmember 16 (described below) is bonded to the dash upper panel 14.

Here, the intermediate inclined wall portion 14C is located such that it extends between an open cross-sectional area A (i.e., a crushable area) and a closed cross-sectional area B. Specifically, taking a virtual line L1, which is shown by the double-dot chain line in FIG. 2, as a boundary, an area on the vehicle top side of the virtual line L1 forms the open cross-sectional area A, while an area on the vehicle bottom side of this virtual line L1 forms the closed cross-sectional area B.

A bottom end portion of the intermediate inclined wall portion 14C is located in the closed cross-sectional area B, and a lower vertical wall portion 14D extends from the bottom end portion towards the vehicle downward side. A bottom inclined wall portion 14E extends from a bottom end portion of the lower vertical wall portion 14D towards the vehicle downward and forward sides, and an upper-side bottom flange 14F extends from a bottom end portion of the bottom inclined wall portion 14E towards the vehicle downward side. Here, a bent portion 14G2 is formed between the intermediate inclined wall portion 14C and the lower vertical wall portion 14D, and a bent portion 14G3 is formed between the lower vertical wall portion 14D and the bottom inclined wall portion 14E.

A panel mounting portion 1411 extends from a bottom end portion of the upper-side bottom flange 14F towards the vehicle downward and forward sides, and a cowl lower panel (not shown) is mounted on this panel mounting portion 14H. In addition, a dash lower panel 18 is also bonded to the surface of the upper-side bottom flange 14F on the vehicle rear side. When seen in a vehicle side view, the dash lower panel 18 extends in the vehicle up-down direction, and a bottom end portion of the dash lower panel 18 is bonded to a floor panel (not shown).

Here, a crossmember 16 is bonded to the surface of the bottom portion of the dash upper panel 14 on the vehicle front side. As shown in FIG. 1, the crossmember 16 is disposed such that, in the same way as the cowl panel 12 and the dash upper panel 14, the longitudinal direction of the crossmember 16 extends in the vehicle transverse direction. Moreover, as shown in FIG. 2, an upper flange 16A that is bonded to the intermediate inclined wall portion 14C is provided on a top end portion of the crossmember 16.

The upper flange 16A extends in parallel with the intermediate inclined wall portion 14C, and a top end portion of the upper flange 16A forms the boundary between the open cross-sectional area A and the closed cross-sectional area B. A vertical wall portion 16B extends from a rear end portion of the upper flange 16A towards the vehicle downward side. This vertical wall portion 16B extends in parallel with the vehicle up-down direction, and an inclined wall portion 16C extends from a bottom end portion of this vertical wall portion 16B towards the vehicle downward and rearward sides. A bent portion 16E is formed between the vertical wall portion 16B and the inclined wall portion 16C. In addition, a lower flange 16D extends from a bottom end portion of the inclined wall portion 16C towards the vehicle downward side, and this lower flange 16D is bonded to the upper-side bottom flange 14F of the dash upper panel 14.

As described above, a closed cross section 24 is formed between the dash upper panel 14 and the crossmember 16. Here, the closed cross section 24 is formed in a polygonal shape (substantially in a pentagonal shape in the present embodiment) when seen in a vehicle side view, so as to include the bent portions 14G2 and 14G3 that are formed in the dash upper panel 14, and the bent portion 16E that is formed in the crossmember 16.

As shown in FIG. 1, in the cowl structure of the present embodiment, when seen in a vehicle front view, a first air intake port 26 is formed on the vehicle right side of an intermediate portion in the vehicle transverse direction of the dash upper panel 14. A front-side communicating hole 30 that forms part of a second air intake port 28 is also formed on the vehicle right side of an intermediate portion in the vehicle transverse direction of the crossmember 16.

The first air intake port 26 is formed in a substantially rectangular shape whose longitudinal direction extends in the vehicle transverse direction, when seen in a vehicle front view. Moreover, as shown in FIG. 3, the first air intake port 26 extends between the upper inclined wall portion 14B and the intermediate inclined wall portion 14C of the dash upper panel 14. Specifically, a top edge of the first intake port 26 is located in a position that is offset towards the vehicle downward side from a top end portion of the upper inclined wall portion 14B, while a bottom edge of the first air intake port 26 is formed by the bond portion where the upper flange 16A of the crossmember 16 is bonded to the dash upper panel 14. The bottom edge of the first air intake port 26 forms the boundary between the open cross-sectional area A and the closed cross-sectional area B.

The second air intake port 28 includes the front-side communicating hole 30 that is formed in the crossmember 16, and a rear-side communicating hole 32 that is formed in the dash upper panel 14. The front-side communicating hole 30 is formed in the vertical wall portion 16B of the crossmember 16, and is formed in a substantially triangular shape whose longitudinal direction extends, when seen in a vehicle front view, in the vehicle transverse direction (sec FIG. 1). An internal space inside the closed cross section 24 and a space on the vehicle front side of the crossmember 16 are in communication with each other via this front-side communicating hole 30. The rear-side communicating hole 32 is formed in a bottom portion of the intermediate inclined wall portion 14C of the dash upper panel 14. Specifically, the rear-side communicating hole 32 is formed in a position that is offset towards the vehicle downward side from the bond portion between the upper flange 16A and the intermediate inclined wall portion 14C, and the internal space inside the closed cross section 24 and a space on the vehicle rear side of the dash upper panel 14 are in communication with each other via this rear-side communicating hole 32.

A bottom edge of the front-side communicating hole 30 according to the present embodiment is located in a position that is offset towards the vehicle upward side of the bent portion 16E, while a bottom edge of the rear-side communicating hole 32 is located in a position that is offset towards the vehicle upward side of the bent portion 14G2.

A duct of an air-conditioning device (not shown) is disposed on the vehicle rear side of the first air intake port 26 and the second air intake port 28. Consequently, when the vehicle 10 is traveling, traveling wind (i.e., air) is introduced into the air-conditioning device from the vehicle forward side via the first air intake port 26. In the same way, traveling wind (i.e., air) is introduced into the air-conditioning device from the vehicle forward side via the second air intake port 28. Specifically, traveling wind is introduced into the closed cross section 24 from the vehicle forward side via the front-side communicating hole 30, and this traveling wind is then introduced into the duct of the air-conditioning device via the rear-side communicating hole 32. Namely, the second air intake port 28 enables traveling wind to be introduced into the air-conditioning device through the interior of the closed cross section 24.

(Operation and Effects)

Next, the operation and effects of the passenger restraint control device according to the present embodiment will be described.

Figure 3:
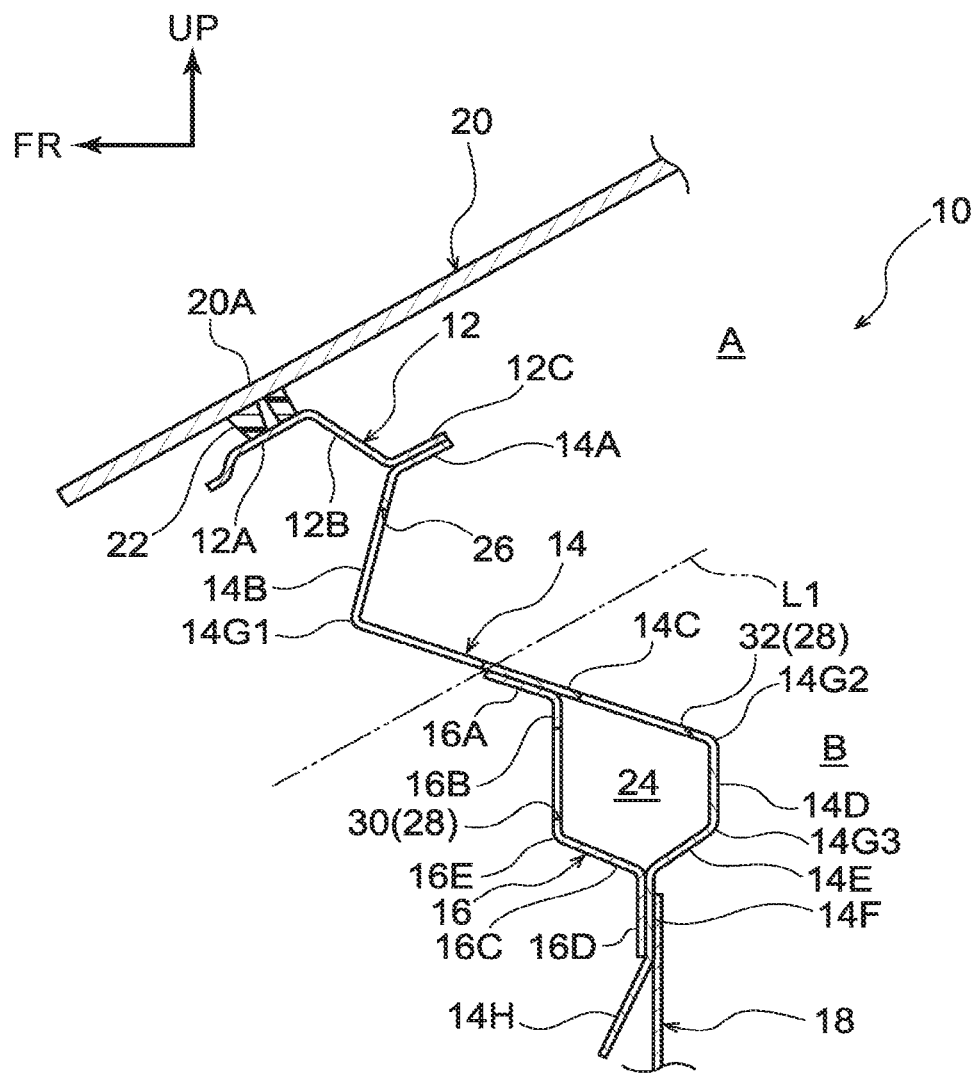
FIG. 3 is an enlarged cross-sectional view showing an enlargement of a cross section taken along a line 3-3 in FIG. 1.

As shown in FIG. 3, in the present embodiment, the open cross-sectional area A is provided on the vehicle upward side of the closed cross-sectional area B, which is formed as a closed cross-sectional structure by the crossmember 16 and the dash upper panel 14. The first air intake port 26 is formed in this open cross-sectional area A. In addition, the second air intake port 28 is formed in the closed cross-sectional area B. Consequently, compared with a structure in which an air intake port is only provided in the open cross-sectional area A, it is possible to reduce the size of the open cross-sectional area A while guaranteeing a satisfactory air conditioning performance. Moreover, because the closed cross-sectional area B can be positioned closer to the windshield 20 by the same distance that the open cross-sectional area A has been reduced, the support rigidity of the windshield 20 can be improved.

Figure 4:
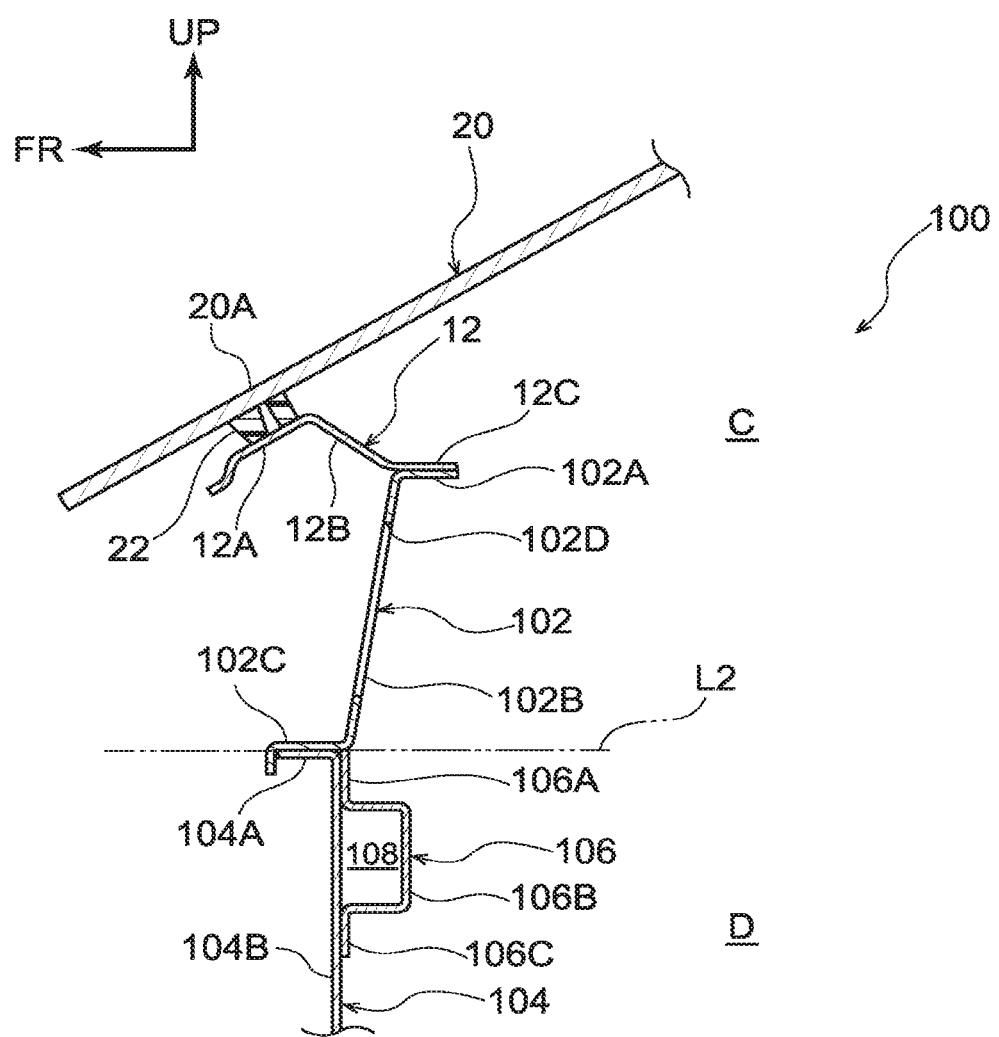
FIG. 4 is a cross-sectional view corresponding to FIG. 3 showing a cowl structure of a comparative example.

The above-described effects will now be described by comparing a cowl structure of a comparative example with the cowl structure of the present embodiment. As shown in FIG. 4, in a vehicle 100 to which a cowl structure of the comparative example has been applied, a dash upper panel 102 is bonded to the vehicle bottom side of a cowl panel 12. In addition, a dash lower panel 104 is bonded to the vehicle bottom side of the dash upper panel 102. A cross member 106 is bonded to a surface on the vehicle rear side of the dash lower panel 104, and a closed cross section 108 is formed by the cross member 106 and the dash lower panel 104.

The dash upper panel 102 extends in the vehicle up-down direction when seen in a vehicle side view, and an upper-side top flange 102A that is bonded to the cowl panel 12 is provided at a top end portion of the dash upper panel 102. An upper-side vertical wall portion 102B extends from the front end portion of the upper-side top flange 102A towards the vehicle downward side, and an upper-side bottom flange 102C extends from the bottom end portion of the upper-side vertical wall portion 102B towards the vehicle forward side. Here, an air intake port 102D is formed in the upper-side vertical wall portion 102B. Moreover, a duct of an air-conditioning device (not shown) is connected to the air intake port 102D.

A lower-side top flange 104A that is bonded to the upper-side bottom flange 102C is provided on a top end portion of the dash lower panel 104. Moreover, a lower-side vertical wall portion 104B extends from a rear end portion of the lower-side top flange 104A towards the vehicle downward side.

The crossmember 106 is bonded to a surface on the vehicle rear side of the lower-side vertical wall portion 104B. The crossmember 106 is provided with an upper flange 106A and a lower flange 106C, and is formed having a substantially hat-shaped cross section that is open towards the vehicle front side. A closed cross section 108 is formed between a main body portion 106B that is formed between the upper flange 106A and the lower flange 106C, and the dash lower panel 104.

In the cowl structure of the comparative example which has the above-described structure, as shown by a virtual line L2 in FIG. 4, a bond portion where the dash upper panel 102 is bonded to the dash lower panel 104 forms a boundary between an open cross-sectional area C and a closed cross-sectional area D. Moreover, in the cowl structure of the comparative example, the air intake port 102D is formed only in the open cross-sectional area C.

Here, a case will be considered in which the aperture area of the air intake port 102D is substantially the same size as the aperture area of the first air intake port 26. In this case, in the cowl structure of the comparative example, because no additional path other than the air intake port 102D is provided in order to introduce air into the air-conditioning device, compared with the cowl structure of the present embodiment, it is not possible to introduce an adequate quantity of air into the air-conditioning device, and there is room for improvement from the standpoint of guaranteeing a satisfactory air conditioning performance (i.e., the air-conditioner air flow and the like).

If the aperture area of the air intake port 102D is increased, then although a satisfactory air-conditioning performance can be guaranteed, because the open cross-sectional area C is enlarged, the closed cross-sectional area D must be moved further away from the windshield 20. As a result, the support rigidity for the windshield 20 is reduced. Moreover, if the position of the crossmember 106 is lowered, there is a possibility of interfering with peripheral components such as the air-conditioning device and the like, and there may be cases in which it is not possible to guarantee that the closed cross section 108 is sufficiently large.

In contrast to this, in the present embodiment, as shown in FIG. 3, because the second air intake port 28 is provided in the closed cross-sectional area B, there is no need to set the open cross-sectional area A to a larger size, and it can be set to the minimum size required to provide the necessary pedestrian protection performance. By employing this structure, the closed cross-sectional area B can be positioned closer to the windshield 20, and the support rigidity for the windshield 20 can be improved at the same time as a satisfactory air conditioning performance is guaranteed.

Moreover, as shown in FIG. 4, in the cowl structure of the comparative example, because the dash lower panel 104, which forms a part of the closed cross section 108, is formed in a flat plate shape, the dash lower panel 104 has a low degree of rigidity. In contrast to this, in the present embodiment, as shown in FIG. 2 and FIG. 3, bent portions are formed in both the crossmember 16 and the dash upper panel 14 (i.e. the bent portion 16E, the bent portion 14G2, and the bent portion 14G3) that make up the closed cross section 24. By employing this structure, even when the closed cross section 24 of the cowl structure according to the present embodiment and the closed cross section 108 of the cowl structure of the comparative example have the same cross-sectional area, the rigidity of each one of the individual components making up the cowl structure according to the present embodiment is greater. Because of this, the support rigidity for the windshield 20 can be improved. In particular, in the present embodiment, the bottom edge of the front-side communicating hole 30, which forms the second air intake port 28 is positioned on the vehicle upward side of the bent portion 16E, and the bottom edge of the rear-side communicating hole 32 is positioned on the vehicle upward side of the bent portion 14G2. By employing this structure, each one of the bent portion 16E, the bent portion 14G2, and the bent portion 14G3 that configure the closed cross section 24 is formed so as to be continuous in the vehicle transverse direction. As a result, even when the second air intake port 28 is formed, it is possible to prevent the rigidity of the closed cross section 24 from becoming weaker in any particular area.

Furthermore, in the present embodiment, as shown in FIG. 3, the bond portion where the upper flange 16A of the crossmember 16 is bonded to the dash upper panel 14 forms the bottom edge of the first air intake port 26, and this bond portion also forms the boundary between the open cross-sectional area A and the closed cross-sectional area B. Namely, this structure enables the closed cross-sectional area B to be positioned as close as possible to the windshield 20 while securing a sufficiently large open cross-sectional area A to protect pedestrians. By employing this structure, even in a vehicle in which the height of the cowl (i.e., the height from the ground to the rear end of the hood) is low, it is possible to improve the support rigidity for the windshield 20 at the same time as a satisfactory air conditioning performance is guaranteed.

Moreover, in the present embodiment, as shown in FIG. 2, the bent portion 14G1 is provided in the open cross-sectional area A. Namely, the upper-side portion of the dash upper panel 14 is bent towards the vehicle forward side. By employing this structure, compared with a structure in which there is no bend in the dash upper panel 14, the open cross-sectional area A can more easily undergo bending deformation, and any impact load can be absorbed more effectively. As a result, it is possible to improve the pedestrian protection performance.

Furthermore, in the present embodiment, as shown in FIG. 3, the front-side communicating hole 30 which configures part of the second air intake port 28 is formed in the vertical wall portion 16B of the crossmember 16. By employing this structure, compared, for example, with a structure in which the second air intake port 28 is formed in a wall portion that is inclined relative to the vehicle up-down direction, such as the inclined wall portion 16C and the like, it is possible for traveling wind to be introduced effectively.

Embodiments of the present disclosure have been described and illustrated above, however, it should be understood that various modifications and the like are possible insofar as they do not depart from the spirit or scope of the present disclosure. For example, as shown in FIG. 1, in the present embodiment, the first air intake port 26 is formed on the vehicle right side of an intermediate portion of the dash upper panel 14 in the vehicle transverse direction; however, the present disclosure is not limited to this and it is also possible to form the first air intake port 26 on the vehicle left side of this intermediate portion in the vehicle transverse direction. Moreover, a first air intake port 26 may be formed in both the left side and the right side of the dash upper panel 14. In the same way, the second air intake port 28 may be formed on the vehicle left side of an intermediate portion of the crossmember 16 in the vehicle transverse direction, or a second air intake port 28 may be formed in both the left side and the right side of the crossmember 16. Furthermore, the shape and the size of the first air intake port 26 and the second air intake port 28 may be suitably modified in accordance with the required air conditioning performance.

Moreover, in the present embodiment, a structure is employed in which the upper-side portion of the dash upper panel 14 is bent towards the vehicle front side, however, the present disclosure is not limited to this. For example, the same type of effects can be obtained if the upper portion of the dash upper panel 14 is bent towards the vehicle rear side. Furthermore, if a satisfactory impact load absorption performance is being achieved, it is also possible to employ a structure in which no bend is formed in the upper portion of the dash upper panel 14.

Moreover, in the present embodiment, a structure is employed in which bent portions are formed in both the crossmember 16 and the dash upper panel 14 that configure the closed cross section 24; however, the present disclosure is not limited to this. For example, in a structure in which the support rigidity for the windshield 20 is raised by increasing the plate thicknesses of the dash upper panel 14 and the crossmember 16, it is possible for either the crossmember 16 or the dash upper panel 14 to be formed in a planar shape.

There are no particular restrictions on the size and shape of the front-side communicating hole 30 and the rear-side communicating hole 32 that form the second air intake port 28. Provided that the support rigidity for the windshield 20 can be secured, then it is also possible for plural front-side communicating holes 30 and rear-side communicating holes 32 to be formed. For example, front-side communicating holes may be formed in both the vertical wall portion 16B and the inclined wall portion 16C of the crossmember 16, and rear-side communicating holes may be formed in both the intermediate inclined wall portion 14C and the lower vertical wall portion 14D of the dash upper panel 14.

Moreover, from the viewpoint of enabling a smooth bending deformation to occur in the open cross-sectional area A, the first air intake port 26 extends between the upper inclined wall portion 14B and the intermediate inclined wall portion 14C; however, the present disclosure is not limited to this. For example, it is possible to form an air intake port in both the upper inclined wall portion 14B and the intermediate inclined wall portion 14C. Namely, it is possible to employ a structure in which the first air intake port 26 is not formed in the position of the bent portion 14G1.

What is claimed is:

1. A cowl structure comprising:
   a cowl panel that supports a bottom end portion of a windshield from a vehicle bottom side;
   a dash upper panel that extends in a vehicle up-down direction when seen in a vehicle side view and has a top end portion that is bonded to the cowl panel;
   a reinforcing component that is bonded to a surface of a vehicle front side or to a surface of a vehicle rear side of a bottom portion of the dash upper panel, and that forms a closed cross section together with the dash upper panel;
   a first air intake port that is formed in the dash upper panel in a location at a vehicle upper side of a bond portion where the dash upper panel is bonded to the reinforcing component, and that introduces air into an air-conditioning device; and
   a second air intake port that is formed in a bottom portion of the dash upper panel and in the reinforcing component, and that introduces air into the air-conditioning device through an interior of the closed cross section.

2. The cowl structure according to claim 1, wherein the dash upper panel has a first bent portion at the vehicle upper side of the bond portion where the dash upper panel is bonded to the reinforcing component, the first bent portion being bent either to the vehicle front side or to the vehicle rear side.

3. The cowl structure according to claim 1, wherein
   the reinforcing component is bonded to a surface of the vehicle front side of the dash upper panel and includes a vertical wall portion that extends in the vehicle up-down direction, and
   a portion of the second air intake port is formed in the vertical wall portion.

4. The cowl structure according to claim 1, wherein the closed cross section is formed in a polygonal shape, when seen in a vehicle side view, by a second bent portion that is formed in the dash upper panel and by a bent portion that is formed in the reinforcing component.

5. The cowl structure according to claim 1, wherein the reinforcing component comprises an upper flange at a top end portion thereof, the upper flange being bonded to the dash upper panel, and
   a bond portion where the upper flange is bonded to the dash upper panel forms a bottom edge of the first air intake port.

6. The cowl structure according to claim 2, wherein the first air intake port is formed at a position that includes the first bent portion in the dash upper panel.

\* \* \* \* \*